United States Patent
Cocchi et al.

(10) Patent No.: US 11,266,162 B2
(45) Date of Patent: Mar. 8, 2022

(54) METHOD AND SYSTEM FOR CLEANING A MACHINE FOR MAKING LIQUID AND/OR SEMI-LIQUID FOOD PRODUCTS FOR THE ICE CREAM, PASTRY OR CATERING TRADE

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI S.P.A.—CARPIGIANI GROUP, Milan (IT)

( * ) Notice: Subject to any disclaimer, the term of this patent is extended or adjusted under 35 U.S.C. 154(b) by 83 days.

(21) Appl. No.: 15/726,088

(22) Filed: Oct. 5, 2017

(65) Prior Publication Data

US 2018/0098556 A1    Apr. 12, 2018

(30) Foreign Application Priority Data

Oct. 7, 2016    (IT) .......................... 102016000100869

(51) Int. Cl.
| | | |
|---|---|---|
| *B08B 3/04* | (2006.01) | |
| *A23G 9/30* | (2006.01) | |
| *A47J 31/60* | (2006.01) | |
| *B08B 3/10* | (2006.01) | |
| *B08B 13/00* | (2006.01) | |
| *C11D 3/395* | (2006.01) | |

(Continued)

(52) U.S. Cl.
CPC ................ *A23G 9/30* (2013.01); *A47J 31/60* (2013.01); *B08B 3/042* (2013.01); *B08B 3/106* (2013.01); *B08B 13/00* (2013.01); *C11D 3/395* (2013.01); *C11D 11/0041* (2013.01); *C11D 17/08* (2013.01); *B08B 2209/032* (2013.01)

(58) Field of Classification Search
CPC . A23G 9/30; A47J 31/60; B08B 3/042; B08B 3/106; B08B 13/00; B08B 2209/032; C11D 3/395; C11D 11/0041; C11D 17/08
See application file for complete search history.

(56) References Cited

U.S. PATENT DOCUMENTS

| | | |
|---|---|---|
| 3,158,485 A | 11/1964 | De Santa Luce |
| 3,327,615 A | 6/1967 | Swan et al. |
| 3,474,821 A | 10/1969 | Fuller et al. |

(Continued)

FOREIGN PATENT DOCUMENTS

| | | |
|---|---|---|
| CN | 1289549 C | 4/2001 |
| CN | 1813558 A | 8/2006 |

(Continued)

OTHER PUBLICATIONS

Italian Search Report dated Jun. 8, 2017 for counterpart Italian Application No. IT 201600100869.

(Continued)

*Primary Examiner* — Sharidan Carrillo
(74) *Attorney, Agent, or Firm* — Shuttleworth & Ingersoll, PLC; Timothy Klima

(57) ABSTRACT

A method and a system for cleaning a machine for making liquid and/or semi-liquid food products for the ice cream, pastry or catering trade, wherein the machine is fed with a capsule containing a preparation for cleaning the machine, after which a cycle for cleaning the machine is started.

1 Claim, 1 Drawing Sheet

(51) Int. Cl.
*C11D 11/00* (2006.01)
*C11D 17/08* (2006.01)

(56) References Cited

U.S. PATENT DOCUMENTS

| | | | |
|---|---|---|---|
| 3,492,126 A | 1/1970 | Rubenstein et al. | |
| 3,517,524 A | 6/1970 | Fiedler et al. | |
| 3,803,870 A | 4/1974 | Conz | |
| 3,969,531 A | 7/1976 | Cornelius | |
| 4,169,359 A | 10/1979 | Weerstra | |
| 4,201,558 A | 5/1980 | Schwitters et al. | |
| 4,659,575 A | 4/1987 | Fiedler | |
| 5,235,902 A | 8/1993 | Ogawa et al. | |
| 5,269,146 A | 12/1993 | Kerner | |
| 5,312,020 A | 5/1994 | Frei | |
| 5,713,214 A | 2/1998 | Ugolini | |
| 5,724,883 A | 3/1998 | Usherovich | |
| 5,967,226 A | 10/1999 | Choi | |
| 6,027,572 A * | 2/2000 | Labib | A61C 1/0076 134/22.12 |
| 6,058,721 A | 5/2000 | Midden et al. | |
| 6,182,862 B1 | 2/2001 | McGill | |
| 6,438,987 B1 | 8/2002 | Pahl | |
| 8,651,011 B2 | 2/2014 | Sinzig | |
| 9,439,446 B2 | 9/2016 | McGill et al. | |
| 9,968,113 B2 * | 5/2018 | Lazzarini | A23G 9/227 |
| 2001/0028913 A1 | 10/2001 | Kolar et al. | |
| 2002/0043071 A1 * | 4/2002 | Frank | A23G 9/045 62/135 |
| 2002/0048626 A1 | 4/2002 | Miller et al. | |
| 2004/0003620 A1 | 1/2004 | Cocchi et al. | |
| 2005/0103024 A1 | 5/2005 | Rugeris | |
| 2005/0109981 A1 * | 5/2005 | Tucker | A61K 31/19 252/186.38 |
| 2005/0178793 A1 | 8/2005 | Cheng et al. | |
| 2006/0005712 A1 * | 1/2006 | Greenwald | A47J 31/465 99/275 |
| 2006/0169147 A1 | 8/2006 | Cocchi et al. | |
| 2006/0201329 A1 * | 9/2006 | Lynch | A47J 31/0689 99/275 |
| 2007/0051248 A1 | 3/2007 | Lee et al. | |
| 2007/0110872 A1 | 5/2007 | Gerber | |
| 2009/0136639 A1 | 5/2009 | Doglioni Majer | |
| 2009/0323462 A1 | 12/2009 | Cocchi et al. | |
| 2010/0034950 A1 | 2/2010 | Jones et al. | |
| 2010/0122539 A1 * | 5/2010 | Cocchi | A23G 9/12 62/1 |
| 2010/0199846 A1 | 8/2010 | Aus der Fuenten et al. | |
| 2010/0229728 A1 | 9/2010 | Kiefer et al. | |
| 2010/0242497 A1 | 9/2010 | Bertone | |
| 2010/0263544 A1 | 10/2010 | Kodden et al. | |
| 2010/0266740 A1 | 10/2010 | Van Den Aker et al. | |
| 2011/0014339 A1 | 1/2011 | Stahl et al. | |
| 2011/0045152 A1 | 2/2011 | Stutz et al. | |
| 2011/0310695 A1 | 12/2011 | Sus et al. | |
| 2012/0074176 A1 | 3/2012 | Sullivan et al. | |
| 2012/0199608 A1 | 8/2012 | Cocchi et al. | |
| 2012/0217264 A1 * | 8/2012 | Cocchi | A23G 9/04 222/95 |
| 2013/0000338 A1 | 1/2013 | Cocchi et al. | |
| 2013/0152797 A1 * | 6/2013 | Mori | A47J 31/3604 99/280 |
| 2013/0263747 A1 | 10/2013 | Ugolini | |
| 2013/0287914 A1 * | 10/2013 | Fragniere | A47J 31/3695 426/416 |
| 2014/0026761 A1 | 1/2014 | Bartoli et al. | |
| 2014/0134299 A1 | 5/2014 | Guidorzi et al. | |
| 2014/0212559 A1 | 7/2014 | Cocchi et al. | |
| 2014/0335232 A1 | 11/2014 | Halachmi | |
| 2014/0345652 A1 * | 11/2014 | Meng | A47J 31/60 134/22.18 |
| 2015/0141313 A1 | 5/2015 | Aregger et al. | |
| 2015/0150412 A1 * | 6/2015 | Heitele | B65D 85/8043 134/22.1 |
| 2015/0272382 A1 | 10/2015 | Truninger et al. | |
| 2015/0289539 A1 | 10/2015 | Noth et al. | |
| 2015/0320078 A1 | 11/2015 | Cocchi | |
| 2015/0329282 A1 | 11/2015 | Bartoli et al. | |
| 2015/0329343 A1 | 11/2015 | Kleinrchert | |
| 2016/0007626 A1 | 1/2016 | Choi et al. | |
| 2016/0052706 A1 | 2/2016 | Talon et al. | |
| 2016/0198735 A1 | 7/2016 | Halachmi | |
| 2016/0214787 A1 | 7/2016 | Iotti | |
| 2016/0242594 A1 * | 8/2016 | Empl | A47J 31/3623 |
| 2016/0249761 A1 | 9/2016 | Llopis | |
| 2016/0302443 A1 * | 10/2016 | Lazzarini | A23G 9/227 |
| 2016/0316781 A1 | 11/2016 | Zappoli et al. | |
| 2017/0042181 A1 | 2/2017 | Fiaschi | |
| 2017/0112165 A1 | 4/2017 | Cocchi et al. | |
| 2017/0135520 A1 | 5/2017 | Sato et al. | |
| 2017/0150844 A1 * | 6/2017 | Hesselbrock | A47J 31/44 |
| 2017/0215456 A1 | 8/2017 | Noth et al. | |
| 2017/0290354 A1 | 10/2017 | Pabst et al. | |
| 2018/0098556 A1 * | 4/2018 | Cocchi | A23G 9/30 |
| 2018/0303122 A1 | 10/2018 | Cocchi et al. | |
| 2018/0305115 A1 | 10/2018 | Bartoli et al. | |

FOREIGN PATENT DOCUMENTS

| | | | |
|---|---|---|---|
| CN | 101617733 A | 1/2010 | |
| CN | 103228152 A | 7/2013 | |
| CN | 103796562 A | 5/2014 | |
| CN | 103857617 A | 6/2014 | |
| EP | 0285709 A1 | 10/1988 | |
| EP | 2401945 A1 | 1/2012 | |
| EP | 2478803 A1 | 7/2012 | |
| EP | 2491792 A1 | 8/2012 | |
| EP | 3058831 A1 | 8/2016 | |
| EP | 3081093 A1 | 10/2016 | |
| EP | 3127431 A1 | 2/2017 | |
| EP | 3158872 A1 | 4/2017 | |
| GB | 1362752 A | 8/1974 | |
| WO | 2011042489 A1 | 4/2011 | |
| WO | 2012036635 A1 | 3/2012 | |
| WO | 2012104760 A1 | 8/2012 | |
| WO | 2012160532 A1 | 11/2012 | |
| WO | 2013019963 A2 | 2/2013 | |
| WO | 2013041581 A1 | 3/2013 | |
| WO | WO2013188246 A2 | 12/2013 | |
| WO | 2014029803 A1 | 2/2014 | |
| WO | WO2015022678 A1 | 2/2015 | |
| WO | 2015056188 A1 | 4/2015 | |
| WO | WO2015092637 A1 | 6/2015 | |
| WO | WO2015104610 A1 | 7/2015 | |
| WO | WO2015170174 A1 | 11/2015 | |
| WO | WO-2016005112 A1 * | 1/2016 | A47J 31/44 |

OTHER PUBLICATIONS

Italian Search Report dated Apr. 19, 2016 from related Italian App No. UB20154199.
Coffee Ice Cream NPL, https://noteatingoutinny.com/2007/04/14/fresh-coffee-premium-ice-cream/, p. 1-2. (Year 2007).
Italian Search Report dated Oct. 24, 107 from related Italian App No. 201700043975.
Italian Search Report dated Sep. 14, 2015 for related Italian application No. BO20150179.
European Exam Report dated Sep. 26, 2017 from related European App No. 16164965.2.
Italian Search Report dated Apr. 20, 2016 for related Italian Application No. IT UB20155038.
Italian Search Report dated Apr. 20, 2017 from related Italian App No. IT 201600074471.
European Search Report dated Nov. 7, 2017 for related European Patent Application No. 17181161.5.
Cocchi—U.S. Appl. No. 15/947,397, filed Apr. 6, 2018.
Cocchi—U.S. Appl. No. 15/647,830, filed Jul. 12, 2017.
Cocchi—U.S. Appl. No. 15/285,876, filed Oct. 5, 2016.
Cocchi—U.S. Patent No. 10,172,373 granted Jan. 8, 2019.
Lazzarini—U.S. Pat. No. 9,968,113 granted May 15, 2018.

(56) References Cited

OTHER PUBLICATIONS

Chinese Office Action dated Nov. 21, 2019 for related Chinese Patent Application No. 201611048851.9.

\* cited by examiner

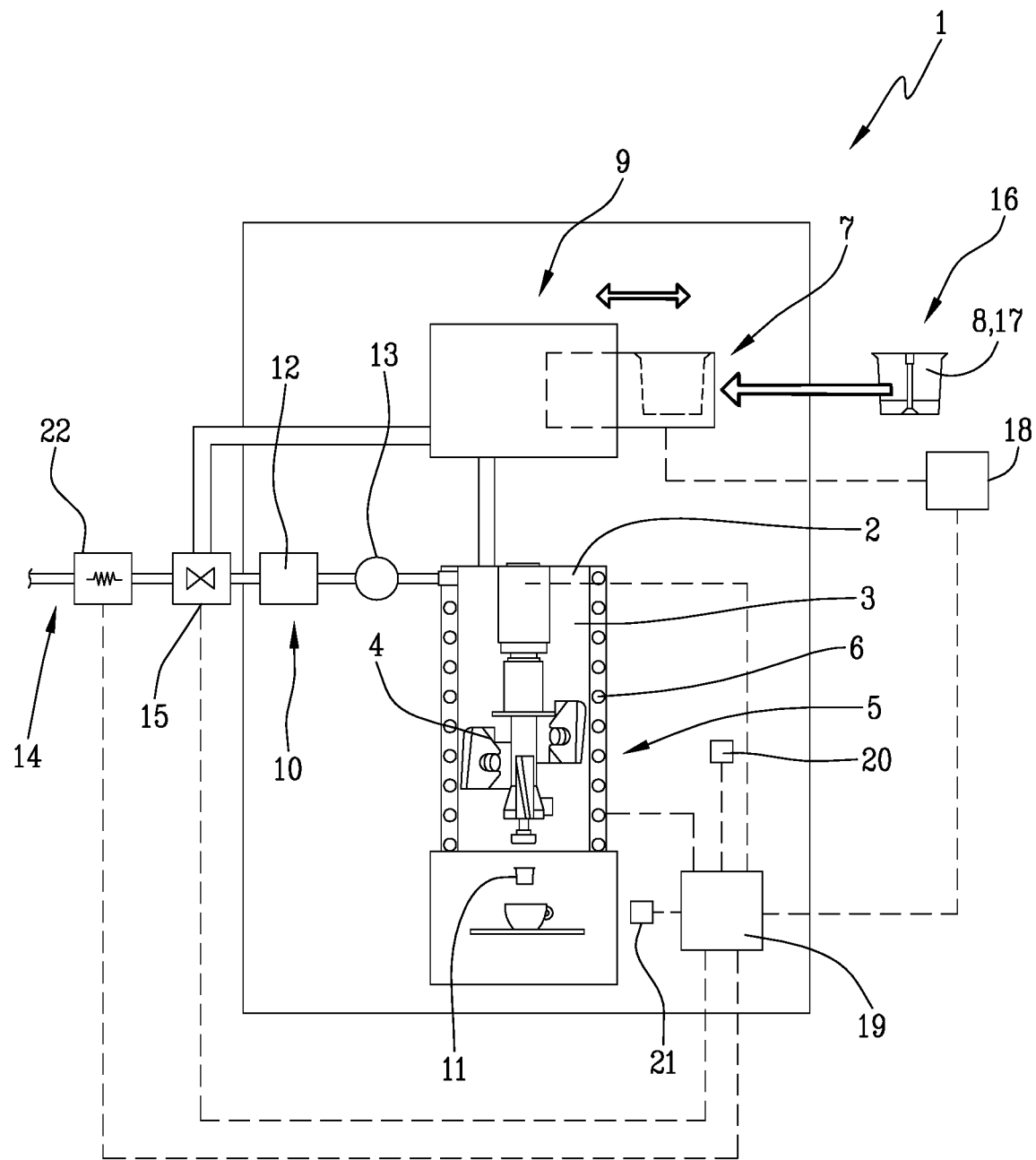

METHOD AND SYSTEM FOR CLEANING A MACHINE FOR MAKING LIQUID AND/OR SEMI-LIQUID FOOD PRODUCTS FOR THE ICE CREAM, PASTRY OR CATERING TRADE

This application claims priority to Italian Patent Application IT 102016000100869 filed Oct. 7, 2016, the entirety of which is incorporated by reference herein.

BACKGROUND OF THE INVENTION

This invention relates to a method and a system for cleaning a machine for making liquid and/or semi-liquid food products for the ice cream trade (ice creams, sorbets, soft ice creams, etc.), the pastry trade (confectionery creams, chocolate creams, etc.) or the catering trade (savory soups, etc.).

A strongly felt need not only in the ice cream trade but also in the pastry and catering trades is the need to be able to make and serve products in small quantities—for example, single portions—in very short times to meet on the spot requests from customers.

To meet this need in the ice cream trade, the prior art has proposed machines which make ice cream in single portions in which the batch freezer is equipped with a specific feed unit which loads into it a capsule containing the ingredients necessary to make the ice cream.

Another need felt in the above mentioned trades is that to be able to reduce the risks of food contamination. For this reason, the machines are cleaned frequently with products containing bactericidal substances.

Cleaning operations are often painstaking and time-consuming tasks and, moreover, are not always carried out in the best of ways by the personnel involved.

SUMMARY OF THE INVENTION

The aim of this invention is to provide a method and system for cleaning a machine for making liquid and/or semi-liquid food products for the ice cream, pastry or catering trade and allowing the machine to be sanitized in a safe, easy, quick and effective manner.

According to the invention, this aim is fully achieved by the method and system for cleaning a machine for making liquid and/or semi-liquid food products for the ice cream, pastry or catering trade, as characterized in the appended claims.

BRIEF DESCRIPTION OF THE DRAWING

The technical features of the invention will become more apparent from the following detailed description of a preferred embodiment of it illustrated by way of non-limiting example in the single accompanying drawing which schematically illustrates a machine for making liquid and/or semi-liquid food products and a related cleaning system.

DESCRIPTION OF THE PREFERRED EMBODIMENTS

With reference to the accompanying drawing, the numeral 1 denotes a machine for making liquid and/or semi-liquid food products.

Although this invention addresses not only the ice cream trade but also the pastry (i.e. bakery and confectionery) and catering trades, that is to say, to machines for making ice creams, sorbets, soft ice creams, confectionery creams, chocolate creams, savory soups, etc., the example described herein refers to a machine 1 for making ice cream.

More in detail, the example described refers to a machine 1 for making ice cream in single portions.

In the context of the invention, the term "ice cream" is used to mean a food preparation which is based on sugars, milk and milk-derived products and cream and to which fruit, aromatics or other ingredients may, if necessary, be added to obtain ice creams of different flavors.

The machine 1 comprises:
a container 2 defining an ice cream processing chamber 3;
a rotary stirrer 4 mounted inside the chamber 3;
a thermal treatment system 5 (for cooling), provided with at least one heat exchanger 6 (coil) associated with the container 2, for exchanging heat therewith;
a receiving device 7 provided with a housing for receiving a capsule 8, made for example of plastic or aluminum and containing a basic preparation, that is to say, the ingredients needed to make the ice cream;
a transfer device 9, interposed between the receiving device 7 and the container 2, for transferring the content of the capsule 8 into the container 2; and
a dispenser 11 for the finished product, that is, the single portion of ice cream, operating at an outlet (not illustrated) of the processing chamber 3.

Optionally, the machine 1 may comprise an injection device 10 for injecting a dilution liquid into the container 2.

Preferably, the dimensions of the container 2 are such as to allow it to hold a portion of finished product, which in the specific case of ice cream, is between 50 g and 400 g, and more preferably, between 75 g and 200 g.

Preferably, the container 2 is cylindrical in shape.

Preferably, the container 2, cylindrical in shape, has a vertical axis.

Preferably, the container 2 is between 50 and 100 mm in diameter.

With reference to the capsule 8, it should be noted that it may contain one or more liquids, or one or more powders, or a granulate, or a gel, defining a basic preparation for making the ice cream.

With reference to the injection device 10, it should be noted that it may be configured to deliver water or a water-based mixture so as to allow diluting the basic preparation in the capsule 8 with water or a water-based mixture.

Alternatively, the injection device 10 may be configured to deliver milk or a milk-based mixture so as to allow diluting the basic preparation in the capsule 8 with milk or a milk-based mixture.

Preferably, the injection device 10 comprises a tank 12 for containing the dilution liquid.

In this case, the injection device 10 preferably further comprises a transfer pump 13 for transferring the dilution liquid from the tank 12 containing it to the point of delivery into the chamber 3.

Preferably, the tank 12 is connected to the main water supply 14 and is configured to draw water directly therefrom.

In this case, the injection device 10 preferably comprises a controllable valve 15 used to place the tank 12 in communication with the main water supply 14.

The stirring and simultaneous thermal cooling treatment step is carried out inside the container 2 so as to convert the basic preparation, diluted with the dilution liquid, into the finished product which, in this specific case, is an ice cream. It should be noted that this step is extremely rapid, in the order of minutes, preferably less than 180 s.

During normal operation, the machine 1, using capsules 8, advantageously allows making very small quantities (single portions) of ice cream in very short spaces of time (to the customer's specifications and taste).

The steps in the normal operation of the machine are outside the scope of this invention and are not therefore described in detail here.

Associated with the machine 1 is a cleaning system 16 by which the machine 1 can be subjected to cleaning operations using products containing bactericidal substances to eliminate or reduce the risks of food contamination.

The cleaning system 16 involves the use of capsules 17 containing a preparation for cleaning the machine 1 and comprises a programmed cycle for cleaning the machine 1.

The preparation for cleaning the machine 1 contained in the capsules 17 comprises at least one of the following products:

sodium hypochlorite-based food safe disinfectant
chlorine
quaternary salts.

The capsules 17 are the same shape and size as the capsules 8, hence interchangeable therewith, and can be loaded into the housing of the receiving device 7 and subsequently processed in the same way as the capsules 8.

Besides their contents, the capsules 17 differ from the capsules 8 in one or more identification elements which allow the user and/or the machine 1 to distinguish between the capsules 17 and 8.

One identification element might be the color of the capsules 8, 17.

Another identification element might be a graphic sign applied on the outside surface of the capsules 8, 17. The graphic sign might be in the form of a text, a drawing, etc.

A further identification element might be a code applied on the outside surface of the capsules 8, 17. The code might be a barcode.

A further identification element might be a magnetic stripe or an RFID label applied on the inside or outside surface of the capsules 8, 17.

For this purpose, the cleaning system 16 comprises means 18 for identifying the type of capsule 8, 17 fed to the machine 1.

The identifying means 18 are preferably associated with the receiving device 7.

The identifying means 18 are preferably integrated in the receiving device 7.

The technology of the identifying means 18 may be optical, magnetic, RFID, etc. or a combination of these, depending on the type of identification element (or combination of identification elements) applied on the capsules 8, 17.

The system 16 preferably also comprises means for automatically switching between normal operating mode of the machine 1 and cleaning operating mode of the machine 1 as a function of the type of capsule 8, 17 identified.

The automatic switching means are part of a control unit 19 of the cleaning system 16.

The control unit 19 is connected, on one side, to the identifying means 18 and, on the other, to the operating parts of the machine 1, as described in more detail below.

Preferably, the user is alerted to the aforementioned switch by a warning light 20 or a display, both also forming part of the cleaning system 16 and driven by the control unit 19.

The control unit 19 is programmed to operate according to the aforementioned programmed cleaning cycle.

The cleaning cycle can be started by the user by means, for example, of a pushbutton 21 and following a warning provided by the warning light 20 or by the display or it can be started automatically by the control unit 19 following the switch to the cleaning operating mode, hence based on an operating program of the machine 1.

The operating program and the cleaning cycle are stored in a memory used by the control unit 19 and therefore form part of the cleaning system 16.

Described below are the steps of the cleaning method carried out by the system 16.

The method basically comprises the following steps:
feeding the machine 1 with a capsule 17 containing a preparation for cleaning the machine 1; and
starting a cleaning cycle in the machine 1.

The cleaning cycle comprises at least the following steps:
extracting the preparation for cleaning the machine 1 from the capsule 17;
causing the cleaning preparation extracted from the capsule 17 to pass through the product processing container 2 (and preferably through the transfer device 9) in order to carry out a cleaning cycle in the machine 1.

In this context, the method further comprises the steps of identifying the type of capsule (8, 17 fed to the machine 1 and automatically switching between normal operating mode of the machine 1 and cleaning operating mode of the machine as a function of the type of capsule 8, 17 identified.

For safety reasons, the user is alerted to the switch by means of the warning light 20 or the display.

In a semiautomatic operating mode of the cleaning system 16, the user can start the cleaning cycle using the pushbutton 21 of the cleaning system 16.

In a fully automatic operating mode of the cleaning system 16, the user need not do anything and the cleaning cycle is started automatically by the control unit 19.

In both cases, the cleaning cycle preferably comprises a step of diluting with water the cleaning preparation extracted from the capsule 17.

Optionally, the cleaning cycle includes an initial step of prewashing with water.

Optionally, the cleaning cycle also includes a final step of rinsing with water.

The water to be used in at least one step of the cleaning cycle is preferably drawn from the main water supply 14 by opening the valve 15, driven by the control unit 19.

Simultaneously, the valve 15 places the main water supply 14 in communication with the transfer device 9 through an auxiliary duct.

The water to be used in at least one step of the cleaning cycle may optionally be heated by means of a heat exchanger 22 located upstream of the valve 15.

Preferably, the cleaning cycle includes rotating the stirrer 4. Optionally, rotation of the stirrer 4 can be inhibited by the control unit 19.

Preferably, the cleaning cycle can include disabling the operation of the thermal treatment system 5. Optionally, operation of the thermal treatment system 5 can be enabled by the control unit 19.

The cleaning cycle described above is easy to start and applies to all the parts of the machine 1 which, during normal operation, work with the ingredients used to prepare the ice cream: more specifically, besides all the ducts, the tank 12, the pump 13, the transfer device 9, the container 2, the stirrer 6 and the dispenser 11.

The invention described above thus allows sanitizing the machine 1 safely, easily, rapidly and effectively.

What is claimed is:

1. A method for cleaning a machine for making a liquid and/or semi-liquid food product for an ice cream, pastry or catering trade, comprising:
   providing a machine including:
   a product processing container that is cylindrical and between 50 and 100 mm in diameter;
   a stirrer positioned in the product processing container;
   a receiving device for receiving a single portion capsule, a type of the single portion capsule being:
      a basic preparation capsule containing a single portion of a basic preparation for making the liquid and/or semi-liquid food product; or
      a cleaning capsule containing a single portion of a cleaning preparation for cleaning the machine, wherein the cleaning preparation comprises quaternary salts;
   a transfer device for transferring the basic preparation from the basic preparation capsule into the product processing container;
   an injection device connected to a water source and configured to inject diluting water at the transfer device for diluting the cleaning preparation extracted from the cleaning capsule and also configured to inject a milk or milk-based mixture into the basic preparation capsule at the transfer device for diluting the basic preparation in the basic preparation capsule, wherein the injection device includes a tank containing the diluting water and a controllable valve;
   switching the machine to a production mode;
   feeding the receiving device with the basic preparation capsule into the machine;
   injecting the milk or the milk based mixture from the injection device to dilute the basic preparation in the capsule;
   transferring the diluted basic preparation to the product processing container to produce the liquid and/or semi-liquid food product;
   feeding the receiving device with a single portion capsule into the machine, wherein the single portion capsule includes an identification element;
   identifying, via the machine, the type of capsule fed into the machine via the identification element;
   upon identification that the single portion capsule is the cleaning capsule, automatically switching the machine from the production mode to a cleaning operating mode;
   alerting a machine user with a warning light or display upon switching to the cleaning operating mode;
   extracting the cleaning preparation from the cleaning capsule;
   performing an automatic cleaning cycle by a control unit, comprising the steps of:
   a. rotating the stirrer;
   b. delivering water from the water source to the controllable valve of the injection device, wherein the water is heated with a heat exchanger;
   c. opening the controllable valve of the injection device during the cleaning cycle, wherein the controllable valve is switchable between
   injecting water directly to the product processing container and injecting water into the cleaning preparation at the transfer device;
   d. performing an initial step of prewashing the product processing container by injecting water from the tank of the injection device into the product processing container;
   e. injecting water from the injection device to the transfer device to dilute the cleaning preparation extracted from the cleaning capsule prior to entry into the product processing container;
   f. causing the cleaning preparation extracted from the cleaning capsule to pass at least through the transfer device and the product processing container to clean the machine; and
   g. performing a final step of rinsing the product processing container by injecting water from the injection device into the product processing container.

* * * * *